United States Patent [19]

Waniczek et al.

[11] Patent Number: 4,783,515

[45] Date of Patent: Nov. 8, 1988

[54] COPOLYMERS CONTAINING ETHYLENE AND α-CYANOACRYLATES

[75] Inventors: Helmut Waniczek, Cologne; Herbert Bartl, Odenthal; Jens Herwig, Cologne, all of Fed. Rep. of Germany

[73] Assignee: Bayer Aktiengesellschaft, Leverkusen, Fed. Rep. of Germany

[21] Appl. No.: 85,146

[22] Filed: Aug. 14, 1987

[30] Foreign Application Priority Data

Aug. 26, 1986 [DE] Fed. Rep. of Germany ....... 3628903

[51] Int. Cl.$^4$ .............................................. C08F 20/42
[52] U.S. Cl. .................................... 526/297; 526/227
[58] Field of Search ........................................ 526/297

[56] References Cited

U.S. PATENT DOCUMENTS

| | | | |
|---|---|---|---|
| 2,765,297 | 10/1956 | Heiligmann et al. | 526/297 |
| 3,796,687 | 3/1974 | Collette et al. | 526/297 |
| 3,884,888 | 5/1975 | Collette et al. | 526/297 |
| 4,170,585 | 10/1979 | Motegi et al. | 526/285 |
| 4,424,327 | 1/1984 | Reich et al. | 526/297 |

Primary Examiner—Joseph L. Schofer
Assistant Examiner—N. Sarofim
Attorney, Agent, or Firm—Connolly & Hutz

[57] ABSTRACT

The present invention relates to copolymers containing ethylene monomer units and α-cyanacrylate monomer units and processes for their production.

8 Claims, No Drawings

COPOLYMERS CONTAINING ETHYLENE AND α-CYANOACRYLATES

α-Cyanoacrylates are monomers which are polymerable by anionic and free-radical mechanisms. Because of their special property of spontaneously polymerizing with water or other bases by an anionic mechanism, they have been used for decades as so-called "superglues". Only a few applications other than those which result from the high anionic polymerization reactivity have hitherto been disclosed.

Copolymers of α-cyanoacrylates with a number of allyl and vinyl compounds, prepared by free-radical copolymerization, have been used for determining the copolymerization parameters. [J. B. Kinsinger et. al, J. Appl. Polym. Sci., 9, 429 (1965); T. Otsu, B. Yamada, Makromol. Ch., 110, 297 (1967).]

However, it has not been possible to copolymerize olefins in a greater than equimolar proportion with α-cyanoacrylates. Some olefins are completely unreactive and, when a copolymerization is attempted, an α-cyanoacrylate homopolymer is formed.

Copolymers of ethylene and α-cyanoacrylates are so far unknown.

The present invention relates to copolymers of ethylene and α-cyanoacrylates. α-Cyanoacrylates are understood as esters of α-cyanoacrylic acid of the formula (I)

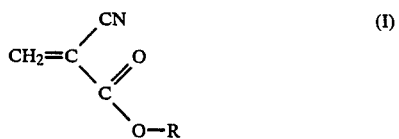

wherein the radical R is a substituted or unsubstituted, linear, branched or cyclic alkyl radical having 1-20 C atoms. Examples of the α-cyanoacrylates used according to the invention are methyl, ethyl, iso- or n-propyl, n-, iso- or tert.-butyl, cyclohexyl, 2-ethylhexyl, ethoxyethyl, tetrahydrofurfuryl, allyl or halogenoalkyl α-cyanoacrylates. Of course, mixtures thereof can also be used.

The present invention relates especially to copolymers which contain (a) ethylene and (b) α-cyanoacrylates in a molar ratio of a:b>1.

The present invention also relates to a process for the preparation of copolymers containing ethylene and α-cyanoacrylates, which is characterized in that ethylene and α-cyanoacrylates are polymerized under an elevated pressure and at an elevated temperature in the presence of free-radical initiators and optionally further additives.

Free-radical initiators are to be understood as those compounds which can decompose at an elevated temperature to give free-radical fragments. Examples of these are certain azo compounds, peroxides, oxygen or substituted diphenylethane.

Those free-radical initiators are preferred which do not themselves start the anionic polymerization of the α-cyanoacrylate. Examples of these are azo compounds such as azoisobutyrodinitrile or diesters of azoisobutyric acid, dialkyl peroxides such as di-tert.-butyl peroxide, 2,2-bis-(t-butylperoxy)-butane or dicumyl peroxide, perketals such as 3,3,6,6,9,9-hexamethyl-1,2,4,5-tetraoxo-cyclononane or 1,1-bis(t-butylperoxy)cyclohexane, alkyl acyl peroxides such as tert.-butyl perneodecanoate, t-amyl perpivalate or t-butyl perbenzoate, diacyl peroxides such as diisononanoyl peroxide, dilauryl peroxide, dibenzoyl peroxide or bis-4-chlorobenzoyl peroxide, sulphonyl peroxides such as acetylcyclohexanesulphonyl peroxide, percarbonates such as diisopropyl peroxodicarbonate, diisotridecyl peroxodicarbonate, bis-(4-tert.-butylcyclohexyl) peroxodicarbonate or dicetyl peroxodicarbonate. Hydrocarbon such as 3,4-dimethyl-3,4-diphenylhexane or 2,3-dimethyl-2,3-diphenylbutane are particularly suitable.

Further additives are understood as, for example, solvents or substances which influence the polymerization kinetics, such as, for example, regulators. Solvents which can be used are above all those which do not start the anionic polymerization of the α-cyanoacrylates. These are aliphatic, cycloaliphatic or aromatic hydrocarbons, which can be substituted or unsubstituted.

Preferably, solvents are used which have a low transfer constant, such as, for example, aliphatic, cycloaliphatic and aromatic hydrocarbons.

n-Hexane, isooctane, neopentane, cyclohexane, toluene, ethylbenzene, isopropylbenzene, t-butylbenzene or chlorobenzene are particularly preferred.

The polymers according to the invention are best prepared under an elevated pressure. A pressure of more than 50 bar has here proved to be appropriate.

A pressure of more than 100 bar is preferred, and a pressure of more than 500 bar is particularly preferred. A pressure of more 1,000 bar is very particularly preferred.

Below a pressure of 1,000 bar, the polymerization is preferably carried out in the presence of a solvent.

An upper pressure limit is given not by the process according to the invention, but by technical feasibilities. In general, the pressure will be less than 10,000 bar.

The copolymers according to the invention are best prepared at an elevated temperature, a temperature range from 20° C. to 300° C. having proved suitable. A temperature of 70° C. to 250° C. is preferred. A temperature range from 150° C. to 230° C. is particularly preferred.

The present invention also relates to homogeneous, amorphous, elastomeric copolymers with monomer units of (a) ethylene, (b) α-cyanoacrylate and (c) further monomers which are copolymerizable by a free-radical mechanism, in a molar ratio of [2 to 200 (a)]:[m(b)+n(c)], with n=0 to 0.2, (m+n)=1.0 and the ratio of [(a)]:[(b)+(c)] being [2 to 200]:[1].

Those having a ratio of [(a)]:[(b)+(c)] of [2 to 20]:[1] are particularly preferred.

Further monomers (c) which are copolymerizable by a free-radical mechanism are olefins such as propylene, 1-butene, butadiene, isobutene, norbornadiene or longer-chain α-olefins, vinyl compounds such as vinyl acetate, vinyl 2-ethylhexanoate, isopropenyl acetate, vinyl benzoate, vinyl chloride, vinylidene chloride or vinyl methyl sulphide, styrenes such as styrene, α-methylstyrene, vinyltoluene or α-acetoxystyrene, maleic acid, acrylic acid, methacrylic acid and esters thereof such as ethyl acrylate, methyl methacrylate, 2-ethylhexyl acrylate, glycidyl acrylate or ethoxyethyl acrylate, allyl compounds such as allyl acetate, allyl chloride or allyl phenyl ether, maleic anhydride and polyfunctional monomers such as divinylbenzene, acrylic acid anhydride, methacrylic acid anhydride or 1,4-butanediol dimethacrylate.

Preferred further monomers (c) which are copolymerizable by a free-radical mechanism are those of the formula (II)

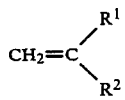

wherein $R^1$ denotes

—COOH, —CONH$_2$, —COOCH$_2$CH$_2$OH,

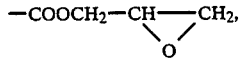

—COOCH$_2$—CH=CH$_2$, —COOCH$_2$—CH$_2$Cl, —CONHCH$_2$CH=CH$_2$ or —COOCH$_2$—CH$_2$—O—CH$_2$—CH$_3$ and $R^2$ denotes hydrogen or methyl.

The copolymers according to the invention are thermoplastic or elastic depending on their composition, and their use is also dependent on this.

Thus, those copolymers according to the invention which, due to their composition, have the character of an elastomer are suitable above all for the preparation of rubber articles, whereas the thermoplastic copolymers according to the invention are suitable for the preparation of injection-molded articles, adhesives, coatings or films.

EXAMPLES 1 TO 4

The monomer streams listed in Table 1 were copolymerized by addition of PO (tert.-butyl perisooctanoate) under a reaction pressure of 1,850 bar (Example 2–4) or 2,100 bar (Comparison Example 1) in a continuous-flow glandless high-pressure stirred 700 ml autoclave with ideal backmixing. The copolymer was freed from unconverted monomers in a downstream flash separator. The reaction temperature was conrolled via the initiator rate. In experiment 2, propanol (PRAL) was metered in as a molecular weight regulator, in order to lower the molecular masses. The experimental parameters and product properties are shown in Table 1.

EXAMPLE 1

(Comparison Example)

The initiator comsumption is very high. There is a risk of ACN; which itself acts as a regulator, being precipitated in the autoclave. This has the consequence that, at this moment, the initiator quantity is so high that sudden polymerization of the ethylene occurs (explosion risk).

EXAMPLES 2–4

ECA also acts as a regulator, as Examples 3 and 4 show. However, the initiator consumption rises only slightly.

TABLE 1

| Example No. | Ethylene [kg/h] | Comonomer *[kg/h] | Pressure [bar] | Temperature [°C.] | Initiator PO [g/h] | MW ** | Regulator [g/h] |
|---|---|---|---|---|---|---|---|
| 1 | 25 | ACN 0.729 | 2,100 | 200 | 24.7 | — | — |
| 2 | 20 | ECA 0.302 | 1,850 | 230 | 2.1 | PRAL | 12 |
| 3 | 20 | ECA 0.693 | 1,850 | 230 | 4.3 | — | — |
| 4 | 20 | ECA 1.537 | 1,850 | 230 | 6.8 | — | — |

| Example No. | MFI*** [g/10 min] | Copolymer output [kg/h] | Comonomer in copolymer [% by weight] | $Q_{spec.}$**** [g/kg] |
|---|---|---|---|---|
| 1 | 7.6 | 3.2 | 22.8 | 7.7 |
| 2 | 23 | 2.6 | 13.8 | 0.81 |
| 3 | >100 | 3.0 | 19.6 | 1.43 |
| 4 | >100 | 3.4 | 33.0 | 2.0 |

*ACN acrylonitrile
ECA ethyl cyanoacrylate
**PRAL propanal
***MFI melt flow index
****$Q_{spec.}$ specific initiator consumption

We claim:
1. A copolymer of (1) and (2) where
   (1) is (a) ethylene and
   (2) is (b) at least one α-cyanoacrylate or mixture of (b) with (c) up to 20% mol % of one or more monomers which are copolymerizable with ethylene and α-cyanoacrylates, by a free-radical mechanism, based on the total weight of (b) and (c),
   where the molar ratio of (1):(2) is from 2:1 to 200:1.
2. A process for the preparation of a copolymer according to claim 1, characterized in that (1) and (2) are subjected to pressures of at least 50 bar in the presence of an initiator.
3. A process for the preparation of a copolymer according to claim 1, characterized in that (1) and (2) are copolymerized continuously under pressures more than 1,000 bar and at temperatures above 150° C.
4. Copolymers according to claim 1, characterized in that the α-cyanoacrylates correspond to the formula

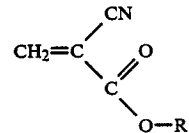

wherein R is a substituted or unsubstituted, linear, branched or cyclic alkyl radical having 1–20 C atoms.
5. Copolymers according to claim 1, characterized in that
   R is a $C_1$–$C_{20}$-alkyl radical.
6. Copolymers according to claim 1, characterized in that (c) is selected from the group comprising the olefins, vinyl compounds, styrenes, α,β-unsaturated mono- or polycarboxylic acids and their anhydrides, esters or amides, with the exception of cyanoacrylates and allyl compounds.
7. Copolymers according to claim 1, characterized in that (c) corresponds to the formula

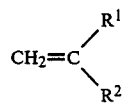
wherein $R^1$ denotes
—COOH, —CONH$_2$, —COOCH$_2$CH$_2$OH, (II)
—COOCH$_2$—CH=CH$_2$,
—CONHCH$_2$CH=CH$_2$ or
—COOCH$_2$—CH$_2$—O—CH$_2$—CH$_3$ and
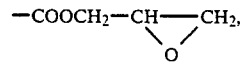
—COOCH$_2$—CH$_2$Cl,
$R^2$ denotes hydrogen or methyl.
8. Copolymers according to claim 1, consisting of ethylene and an α-cyanoacrylate.
* * * * *